(12) United States Patent
Parker

(10) Patent No.: US 11,914,522 B2
(45) Date of Patent: Feb. 27, 2024

(54) VERIFYING ADDRESS TRANSLATION INTEGRITY

(71) Applicant: ARM LIMITED, Cambridge (GB)

(72) Inventor: Jason Parker, Sheffield (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/907,206

(22) PCT Filed: Feb. 8, 2021

(86) PCT No.: PCT/GB2021/050279
§ 371 (c)(1),
(2) Date: Sep. 23, 2022

(87) PCT Pub. No.: WO2021/198636
PCT Pub. Date: Oct. 7, 2021

(65) Prior Publication Data
US 2023/0109159 A1   Apr. 6, 2023

(30) Foreign Application Priority Data

Mar. 31, 2020 (GB) ..................... 2004744

(51) Int. Cl.
*G06F 12/10* (2016.01)
*G06F 12/1027* (2016.01)
*G06F 12/14* (2006.01)

(52) U.S. Cl.
CPC .......... *G06F 12/10* (2013.01); *G06F 12/1027* (2013.01); *G06F 12/14* (2013.01); *G06F 2212/1032* (2013.01)

(58) Field of Classification Search
CPC ...... G06F 12/10; G06F 12/1027; G06F 12/14; G06F 2212/1032; G06F 11/1004; G06F 12/1475; G06F 12/1491; G06F 21/64; G06F 21/74; G06F 21/79; G06F 12/1009; G06F 11/07; G06F 11/10
USPC ........................................... 711/202
See application file for complete search history.

(56) References Cited

U.S. PATENT DOCUMENTS

| 2015/0058578 A1* | 2/2015 | Ries ..................... G06F 12/0862 711/137 |
| 2018/0067799 A1 | 3/2018 | Genshaft et al. |
| 2020/0409734 A1* | 12/2020 | Sahita ................... G06F 9/5022 |

* cited by examiner

Primary Examiner — Hua J Song
(74) Attorney, Agent, or Firm — NIXON & VANDERHYE P.C.

(57) ABSTRACT

Apparatuses, methods, and programs for performing a translation of a virtual address of a memory access to a physical address associated with a memory location to be accessed are disclosed. A page table descriptor is accessed when performing the translation, which comprises translation parameters for the translation. The descriptor further comprises an integrity check value, wherein the integrity check value is dependent on the translation parameters.

16 Claims, 7 Drawing Sheets

VERIFYING ADDRESS TRANSLATION INTEGRITY

The present techniques relate to data processing systems.

A data processing system may comprise memory access control circuitry to perform a translation of a virtual address of a memory access to a physical address associated with a memory location to be accessed.

At least some examples provide an apparatus comprising: memory access control circuitry to perform a translation of a virtual address of a memory access to a physical address associated with a memory location to be accessed, wherein the memory access control circuitry is arranged to access a page table when performing the translation, wherein the page table comprises a descriptor comprising translation parameters for the translation, and wherein the descriptor further comprises an integrity check value, wherein the integrity check value is dependent on the translation parameters.

At least some examples provide a data processing method comprising: performing a translation of a virtual address of a memory access to a physical address associated with a memory location to be accessed, wherein performing the translation comprises accessing a page table, wherein the page table comprises a descriptor comprising translation parameters for the translation, and wherein the descriptor further comprises an integrity check value, wherein the integrity check value is dependent on the translation parameters.

At least some examples provide a computer program for controlling a host data processing apparatus to provide an instruction execution environment for execution of target code, the computer program comprising: memory access control logic to perform a translation of a virtual address of a memory access to a physical address associated with a memory location to be accessed, wherein the memory access control logic is arranged to access a page table when performing the translation, wherein the page table comprises a descriptor comprising translation parameters for the translation, and wherein the descriptor further comprises an integrity check value, wherein the integrity check value is dependent on the translation parameters.

At least some examples provide a computer-readable storage medium storing the above-mentioned computer program.

The present techniques will be described further, by way of example only, with reference to embodiments thereof as illustrated in the accompanying drawings, to be read in conjunction with the following description, in which:

FIG. 1 schematically illustrates an example of a data processing system in which page table descriptor integrity verification is carried out;

FIG. 2A schematically illustrates an example of integrity verification being carried out on a page table descriptor;

FIG. 2B schematically illustrates an example of integrity verification being carried out on a page table descriptor;

FIG. 2C schematically illustrates an example of integrity verification being carried out on a page table descriptor;

FIG. 3A schematically illustrates an example of a multi-level page table in which an integrity check value is provided at more than one level;

FIG. 3B schematically illustrates an example of integrity verification being carried out using integrity check values from more than one level of a multi-level page table;

FIG. 3C schematically illustrates the use of a control bit at a higher level of a multi-level page table to delegate authentication of descriptors at subsequent levels from more-privileged software to less-privileged software;

FIG. 4 schematically illustrates an example of an apparatus in which page table descriptor integrity verification is carried out;

Figure 1:
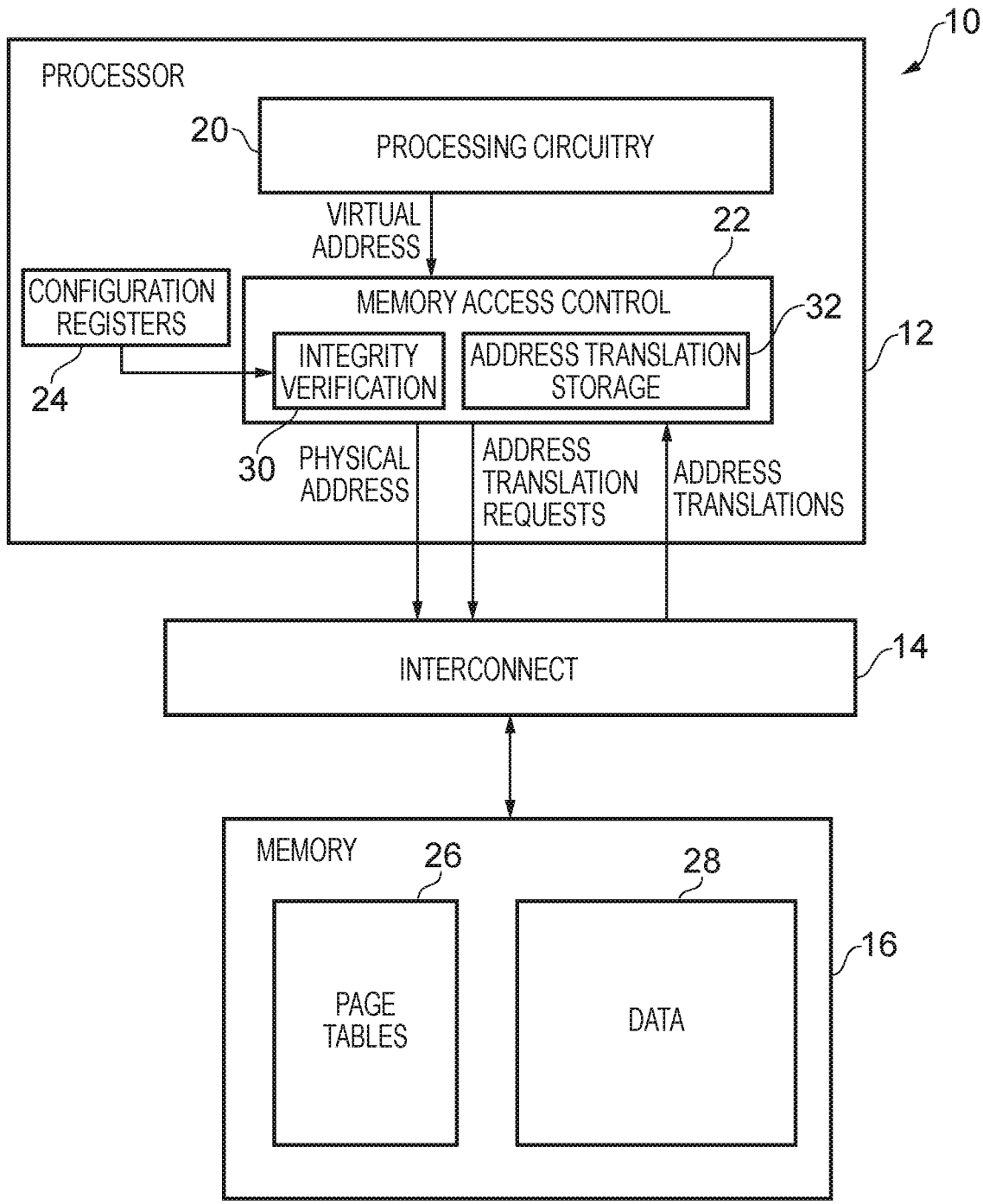

Data processing systems may support the use of virtual memory, whereby address translation capability is provided to translate a virtual address specified by a memory access request into a physical address associated with a memory location to be accessed. The mappings between virtual addresses and physical addresses may be defined in one or more page table structures. The page table entries within the page table structures could also define some access permission information which may control whether a given software process executing in the data processing system is allowed to access a particular address.

In some examples herein there is an apparatus comprising: memory access control circuitry to perform a translation of a virtual address of a memory access to a physical address associated with a memory location to be accessed, wherein the memory access control circuitry is arranged to access a page table when performing the translation, wherein the page table comprises a descriptor comprising translation parameters for the translation, and wherein the descriptor further comprises an integrity check value, wherein the integrity check value is dependent on the translation parameters.

The page tables and the descriptors which they comprise are stored in memory and therefore require memory accesses in order for them to be retrieved, so that the address translations and access permissions which they define can be implemented. The memory access control circuitry which performs the translation of a virtual address to a physical address may be provided with its own local storage capability such that page table entries retrieved from memory can be quickly reused, i.e. without incurring the latency associated with a memory access. Such local storage capability may for example be in the form of a cache structure, of which a translation lookaside buffer (TLB) is just one example. Nevertheless the definitive copy of a given page table entry is stored in memory and this must be retrieved at least once initially by means of a memory access. The present techniques recognise that in this context such page table entries could be vulnerable to memory corruption, whether this is due to a random event such as radiation strike causing one or more bits in memory to flip or whether it is due to an intentional attack, such as error injection, i.e. carried out by a malicious agent. The provision of an integrity check value within the descriptor itself provides a defence against such corruption and furthermore, and where the integrity check value is dependent on the translation parameters of the descriptor, this defence specifically protects those translation parameters. In consequence the address translations and memory access permissions which the descriptor defines are also so protected.

The integrity check value and its relationship to the translation parameters of the descriptor may be used in a variety of ways in order to provide an integrity confirmation. On the one hand this information may be used by software executing in a data processing system of which the apparatus forms part, whether when writing to a page table in order to define the parameters of the descriptor or when reading from the page table in order to make use of the parameters given by the descriptor. On the other hand this information may be used by hardware, for example the apparatus itself, when reading from the page table in order to make use of the parameters given by the descriptor, e.g. as part of a hardware implemented address translation process.

In some examples the memory access control circuitry is responsive to the memory access to perform a descriptor integrity check comprising: reading the descriptor; calculating an integrity verification value dependent on the translation parameters of the descriptor; and when the integrity verification value matches the integrity check value, allowing the memory access to proceed, and when the integrity verification value does not match the integrity check value, blocking the memory access. Accordingly when handling memory access requests the descriptor integrity check may be an integral part of that handling. Furthermore although the descriptor integrity check can be carried out with respect to a descriptor which has just been retrieved from memory, the descriptor integrity check is not limited to only being carried out at that juncture and any time the descriptor is used its integrity can be so verified.

The apparatus may be arranged to respond in a variety of ways when a descriptor integrity check fails, i.e. the integrity of the descriptor is not confirmed. In some examples the descriptor integrity check further comprises, when the integrity verification value does not match the integrity check value, signalling an error to privileged software. The privileged software can then take one or more further steps in response to this signalled error and these further step(s) may take a variety of forms. To give just some examples the privileged software may take action to repair the descriptor and its integrity check value, the privileged software may take action with respect to a perceived source of the error that has occurred, for example where the possibility exists that the error has occurred because of a software based attack, and the privileged software may prevent one or more instances of currently executing less privileged software from continuing.

The integrity check value is dependent on the translation parameters of the descriptor and as described above this provides specific protection for the address translations which can then be performed when using this descriptor. Nevertheless various configurations are proposed for the extent to which the integrity check value is dependent on the content of the descriptor. In some examples the integrity check value is dependent on all of the descriptor other than the integrity check value. In some examples the integrity check value is dependent on less than all of the descriptor other than the integrity check value. When the integrity check value is dependent on less than all of the descriptor (other than the integrity check value itself) this therefore means that the descriptor may have content which is not protected by the integrity check value. This provides the opportunity for the descriptor to hold certain data, which is related to memory access to the region of memory to which the descriptor applies, but which may be allowed to be modified (i.e. without this causing the descriptor integrity check to fail). For example such data could be bits indicating recent access to or modification of the region of memory, where these bits are used by a memory page management system to determine what data to hold locally and what to put out to memory. Thus a useful balance is achieved in which the integrity of the descriptor with regards to the translations and permissions it defines can be verified, yet still allowing less privileged software to carry out other aspects of memory management (such that these do not also have to be performed by more privileged software).

In some examples the memory access control circuitry is arranged to access the page table via multiple levels of a multi-level page table when performing the translation, and wherein more than one level of the multiple levels of the multi-level page table comprises an entry comprising a level-specific integrity check value, wherein the level-specific integrity check value is dependent on the entry. The address translations may be defined by means of a multi-level page table (i.e. a page table hierarchy). A higher level of such a page table arrangement may point to a next-lower level, and may also provide translation parameters for the translation. Due to the hierarchical structure, more generally applied definitions can be provided by higher levels of the hierarchy, whilst memory region specific definitions may be provided by the lowest levels of the hierarchy. Providing a level-specific integrity check value for more than one level of the multiple levels of the multi-level page table provides a broader integrity check for the page table process which is used to derive the required translation parameters.

In some examples the memory access control circuitry is arranged to access the page table via multiple levels of a multi-level page table when performing the translation, and wherein a control descriptor of a control level of the multiple levels comprises a control bit, wherein a value of the control bit defines whether subsequent levels of the multi-level page table must be integrity authenticated by privileged software. This provides flexibility in the management of memory regions, wherein for example more privileged software can validate a larger region of the memory address space, while sub-regions can be left to be directly managed by less privileged software. This control bit may be set at any level of a multi-level page table arrangement. and the value of this control bit is then propagated through the further levels of the page tables.

Flexibility may be provided in terms of configuring the elements of the descriptor on which the integrity check value depends. In some examples the apparatus further comprises configuration storage holding a mask value, wherein the mask value defines which elements of the descriptor the integrity check value is dependent upon. In examples with level-specific integrity check values for a multi-level page table the apparatus may further comprise configuration storage holding more than one mask value, wherein for each of the more than one level of the multi-level page table a respective mask value defines which elements of the entry the level-specific integrity check value is dependent upon. Such configuration storage may take a variety of forms. In some examples this storage is one or more configuration registers.

Whilst it is necessary for a trusted entity to originally define the descriptor and to calculate its integrity check value, this trusted entity may be provided in a variety of ways and may itself be invoked by a range of other system entities. In some examples, the memory access circuitry comprises integrity verification value calculation circuitry to generate the integrity check value, wherein the integrity verification value calculation circuitry comprises authenticated integrity check value generation circuitry to generate the integrity check value in dependence on a private key. The use of a private key (such as in the in the generation of a MAC (message authentication code) as the integrity check value), provides a mechanism for ensuring that the integrity check value can be trusted. In some examples the authenticated integrity check value generation circuitry may be invoked by even less trusted system entities (e.g. less privileged software). However in other examples authenticated integrity check value generation circuitry is arranged to generate the integrity check value in response to more-privileged software and is arranged not to generate the integrity check value in response to less-privileged software. A further mechanism for protecting the integrity check value would be to restrict actions which are allowed to take place with respect to a stored descriptor. Access to the descriptor and its integrity check value can then be provided to a range of entities, as long as reliable demarcation is implemented for what actions that range of entities is allowed to take with respect to the descriptor and its integrity check value. However it may be preferred to allow wider access rights (including modification) to the descriptor stored in memory, for example to allow flexibility in terms of the range of entities that can carry out memory management actions with respect to the memory region in which the descriptor is stored. In examples in which the authenticated integrity check value generation circuitry is arranged to generate the integrity check value in response to more-privileged software and is arranged not to generate the integrity check value in response to less-privileged software this therefore means that only a trusted entity (e.g. more-privileged software) can cause the generation of the integrity check value. Thus, whilst a non-trusted entity (e.g. less-privileged software) may be allowed to fully access (i.e. even modify) the descriptor (including its integrity check value) in memory, an integrity check value which has not been generated in dependence on the private key would then fail a subsequent integrity check verification.

In some examples herein there is a data processing method comprising: performing a translation of a virtual address of a memory access to a physical address associated with a memory location to be accessed, wherein performing the translation comprises accessing a page table, wherein the page table comprises a descriptor comprising translation parameters for the translation, and wherein the descriptor further comprises an integrity check value, wherein the integrity check value is dependent on the translation parameters.

In some examples the method further comprises performing a descriptor integrity check, wherein the descriptor integrity check comprises: reading the descriptor; calculating an integrity verification value dependent on the translation parameters of the descriptor; and when the integrity verification value matches the integrity check value, allowing the memory access to proceed, and when the integrity verification value does not match the integrity check value, blocking the memory access.

In some examples the descriptor integrity check further comprises, when the integrity verification value does not match the integrity check value, signalling an error to privileged software. In some examples the integrity check value is dependent on all of the descriptor other than the integrity check value. In some examples the integrity check value is dependent on less than all of the descriptor other than the integrity check value.

In some examples performing the translation comprises accessing the page table via multiple levels of a multi-level page table when performing the translation, and wherein more than one level of the multiple levels of the multi-level page table comprises an entry comprising a level-specific integrity check value, wherein the level-specific integrity check value is dependent on the entry.

In some examples the method further comprises storing a mask value, and wherein the mask value defines which elements of the descriptor the integrity check value is dependent upon. In some examples the method further comprises storing more than one mask value, wherein for each of the more than one level of the multi-level page table a respective mask value defines which elements of the entry the level-specific integrity check value is dependent upon.

In some examples the method further comprises an integrity value generation step of: generating the integrity check value in dependence on a private key.

In some examples the integrity value generation step comprises: generating the integrity check value for storage as part of the descriptor, wherein the integrity value generation step is performed in response to more-privileged software and is not performed in response to less-privileged software.

In some examples there is a computer program for controlling a host data processing apparatus to provide an instruction execution environment for execution of target code, the computer program comprising: memory access control logic to perform a translation of a virtual address of a memory access to a physical address associated with a memory location to be accessed, wherein the memory access control logic is arranged to access a page table when performing the translation, wherein the page table comprises a descriptor comprising translation parameters for the translation, and wherein the descriptor further comprises an integrity check value, wherein the integrity check value is dependent on the translation parameters.

In some examples there is a computer-readable storage medium storing the computer program mentioned above.

Some particular embodiments are now described with reference to the figures.

FIG. 1 schematically illustrates an example of a data processing system 10 having a processor 12 connected via an interconnect 14 to a memory 16. The processor 12 is shown to comprise processing circuitry 20, memory access control 22, and a set of configuration registers 24. As part of the data processing operations which it carries out, the processing circuitry 20 generates memory access requests, where the memory location to which access is sought is specified as a virtual address. Memory access control circuitry 22 (e.g. a memory management unit (MMU)) translates the virtual address into a physical address through one or more stages of address translation based on page table data defined in page table structures 26 stored in the memory 16. The memory 16 also stores data 28 at locations specified by physical addresses. The memory access control 22 comprises integrity verification circuitry 30 and address translation storage 32. The address translation storage 32 is provided to hold copies of parts of the page table data which had previously been retrieved from memory. Accordingly when a virtual address is encountered by the memory access control 22 (as part of a memory access request) for which the required page table data for performing the address translation is not currently present in the address translation storage 32, an address translation request is generated by the memory access control 22 to retrieve this page table data from the page table 26. The page table data returned from memory 16 is then stored in the address translation storage 32. The address translation storage 32 may have a cache structure (e.g. a translation lookaside buffer (TLB)). With the required page table data then locally present, the memory access control 22 can then not only determine the physical address corresponding to the virtual address, but also determine whether this memory access should be allowed to proceed based on permissions information forming part of the page table data. Additionally the memory access control 22 uses its integrity verification circuitry 30 to verify the integrity of page table data, and in particular the integrity of descriptors in the page table data providing the translation parameters. This integrity checking process and the circuitry components of the integrity verification circuitry to support it are described in more detail with respect to the figures which follow. The integrity checking may be performed solely on the basis of the descriptor itself (and the integrity check value which it comprises), but may also be performed taking into account further configuration data and FIG. 1 shows a configuration registers 24 within the processor 12 providing such further configuration data to the integrity verification circuitry 30.

Figure 2A:
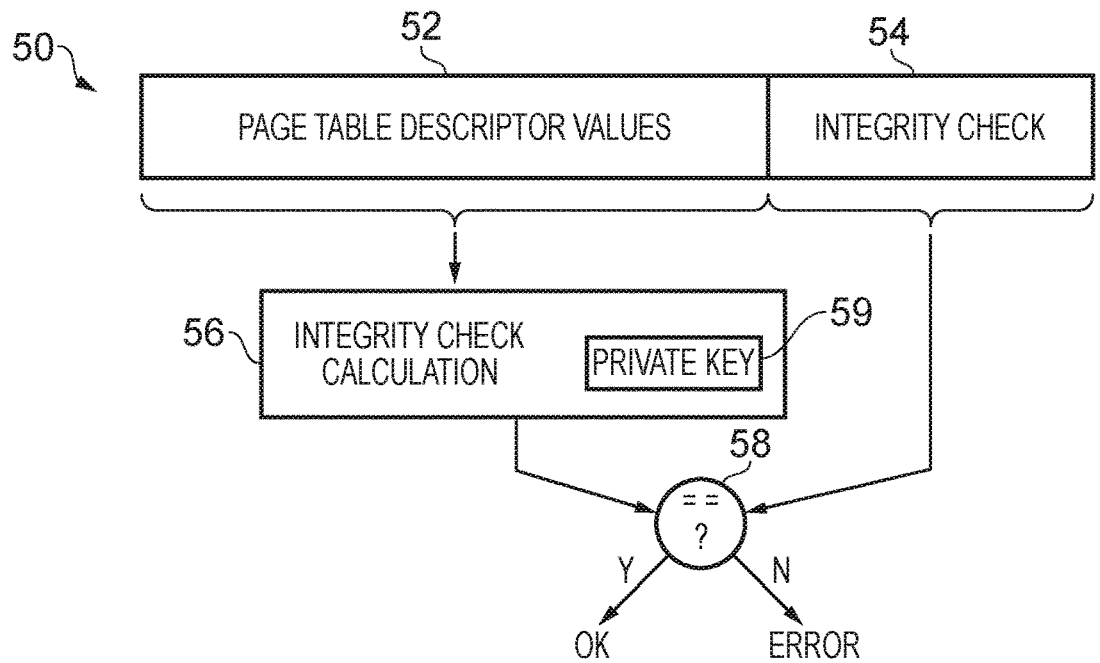

FIG. 2A schematically illustrates a descriptor 50 comprising various page table descriptor values 52 and an integrity check value 54. In order to carry out a descriptor integrity check with respect to the descriptor 50, an integrity check calculation is performed on the page table descriptor values 52 by the integrity check calculation circuitry 56. Any technically feasible integrity check calculation may be used for the verification of the integrity of the descriptors, for example MAC (message authentication code), CRC (cyclic redundancy check), and so on. However the security of the system is further improved when (as in the case of a MAC, though not a CRC) a private key forms part of the integrity check calculation, because this protects against an intentional malicious modification of the translation parameters of the descriptor and its integrity check value. Non-authenticated integrity check values can nevertheless be used and still protect against non-malicious modification of the translation parameters (such as due to a radiation strike causing a bit flip). However in the example of FIG. 2A the integrity check calculation is authenticated with reference to a securely held private key 59. The value generated by the integrity check calculation is then compared by comparison circuitry 58 to the integrity check value 54 which forms part of the descriptor 50. It will therefore be understood that the same integrity check calculation was previously performed when descriptor 50 was defined and stored. When the comparison circuitry 58 determines that the two values are the same then the integrity of the descriptor 50 is verified. Conversely when the comparison circuitry 58 determines that the two values are not the same then either the page table descriptor values 52 or the integrity check value 54 (or both) have been modified since the descriptor 50 was defined and stored. Whilst the process shown in FIG. 2A has been described in terms of hardware which carries out the descriptor integrity check (e.g. within the integrity verification circuitry 30 of the memory access control circuitry 22 in the example of FIG. 1), the same descriptor integrity check can also be carried out by software components of the data processing system. In this latter case the integrity check calculation 56 and the comparison 58 are provided by routines of the relevant software component.

Figure 2B:
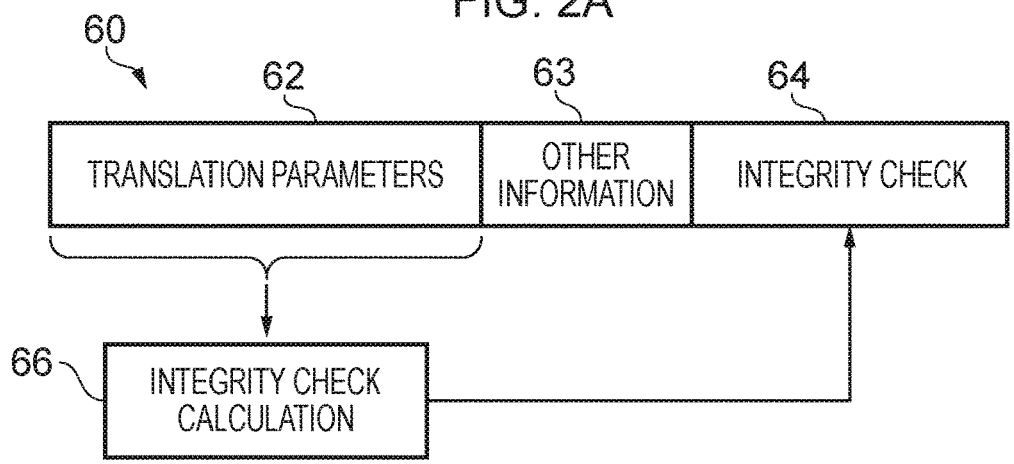

FIG. 2B schematically illustrates a descriptor 60 in a variant on the example of FIG. 2A. Here the descriptor 60 is shown to comprise a set of translation parameters 62, other information 63, and an integrity check value 64. The integrity check value 64 is shown being created in dependence on the translation parameters 62 by the integrity check calculation 66. As in the case of FIG. 2A the integrity check calculation is authenticated with reference to a securely held private key (not explicitly shown in FIG. 2B). Accordingly, the process shown in FIG. 2B can represent part of an initialisation process for the data processing system during which a trusted system entity (e.g. more privileged software) defines the descriptor 60 (including calculating its integrity check value 64) and causes storage of the descriptor 60 in the page tables 26 of the memory 16. Thus in that scenario the integrity check calculation 66 is performed by software, but in other examples the generation of the integrity check value 64 can be performed by hardware configured to operate in a trusted manner. Hence it may be the integrity verification circuitry 60 of the memory access control 22 which performs the integrity check calculation (possibly as a task delegated to it by trusted software) to generate the integrity check value 64 before the descriptor 60 is stored to memory. Note also that the descriptor 60 is shown to comprise other information 63 in addition to the translation parameters 62 and that the integrity check calculation 66 is performed taking the translation parameters 62 as an input without inclusion of the other information 63. Accordingly whilst all the translation parameters 62 are included in the integrity check calculation, such that their integrity can be protected by the use of the integrity check value 64, it is not necessary for the entirety of the descriptor 60 to be included in the integrity check calculation 66.

Figure 2C:
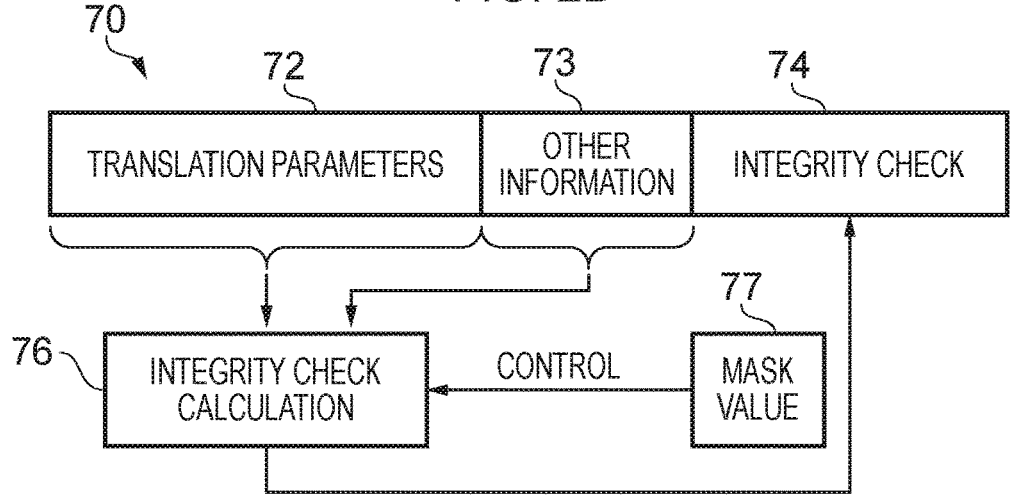

FIG. 2C schematically illustrates a descriptor 70 in a variant on the examples of FIGS. 2A and 2B. As in the case of the descriptor 60 in FIG. 2B, the descriptor 70 is shown to comprise a set of translation parameters 72, other information 73, and an integrity check value 74. Here the integrity check calculation 76 is shown to receive the translation parameters 72, the other information 73, and a mask value 77 as inputs. As in the case of FIG. 2A the integrity check calculation is authenticated with reference to a securely held private key (not explicitly shown in FIG. 2C). The mask value is provided by the content of a configuration register (e.g. from configuration registers 24 in FIG. 1). The mask value 77 controls the extent to which the other information 73 is used in the integrity check calculation 76. Thus in one maximal configuration the mask value may cause the integrity check calculation 76 to use all of the other information 73 (in addition to the translation parameters 72) and the integrity check value is than calculated in the same manner as the example of FIG. 2A. Conversely in another minimal configuration the mask value may cause the integrity check calculation 76 to use none of the other information 73 (i.e. only to use the translation parameters 72) and the integrity check value is than calculated in the same manner as the example of FIG. 2B. The mask value may be freely defined between these two extremes, to use some but not all of the other information 73. The other information 73 may be used for a range of purposes related to the function of the descriptor. For example it may hold various meta-state data relating to the usage of the descriptor and the memory region it relates to. Where (part of) the other information is required to be robust and to be protected against corruption, it is included in the integrity check calculation. Where (part of) the other information does not have this requirement, it can be excluded from the integrity check calculation. One usage of at least part of this other information may be to provide software with usable bits in the descriptor to record and read information related to the memory region to which the descriptor relates. For example a memory management process can use such bits to hold "access" and "dirty" bits, indicating access to and modification of the memory region. The present techniques are not restricted to any particular size of descriptor, but in one configuration the descriptors 50, 60, and 70 are 64-bit page table entry. Hence as one example subdivision, the page table entry comprises 48 bits of permission fields for the translation, 8 bits of meta-state (other) data, and an 8-bit integrity check value.

Figure 3A:
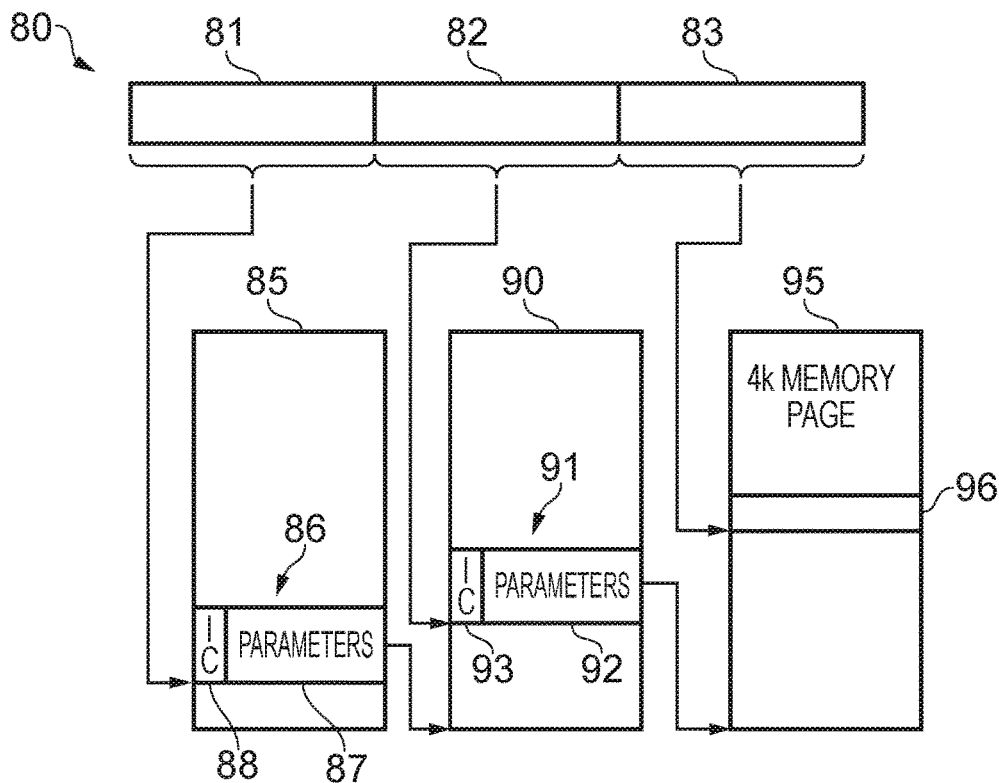

FIG. 3A schematically illustrates the use of a multi-level page table in one example. A virtual memory address 80 is shown to be subdivided into three portions. A first portion 81 of the address is used when accessing a higher level 85 of the page table hierarchy to select an entry 86. The entry 86 comprises parameters 87 related to the address translation as well as an integrity check value 88. The parameters 87 indicate the base address of a lower level 90 of the page table hierarchy, which is then accessed using a second portion 82 of the address to select an entry 91. This entry 91 also comprises parameters 92 related to the address translation as well as an integrity check value 93. The parameters 92 indicate the base address of a 4 kB memory page and the third portion 83 of the address indicates the physical address 96 to which access is sought. A multilevel page table in which integrity check values are used at more than one level may comprise more than two levels, but the illustration of FIG. 3A only illustrates two merely for brevity and clarity.

Figure 3B:
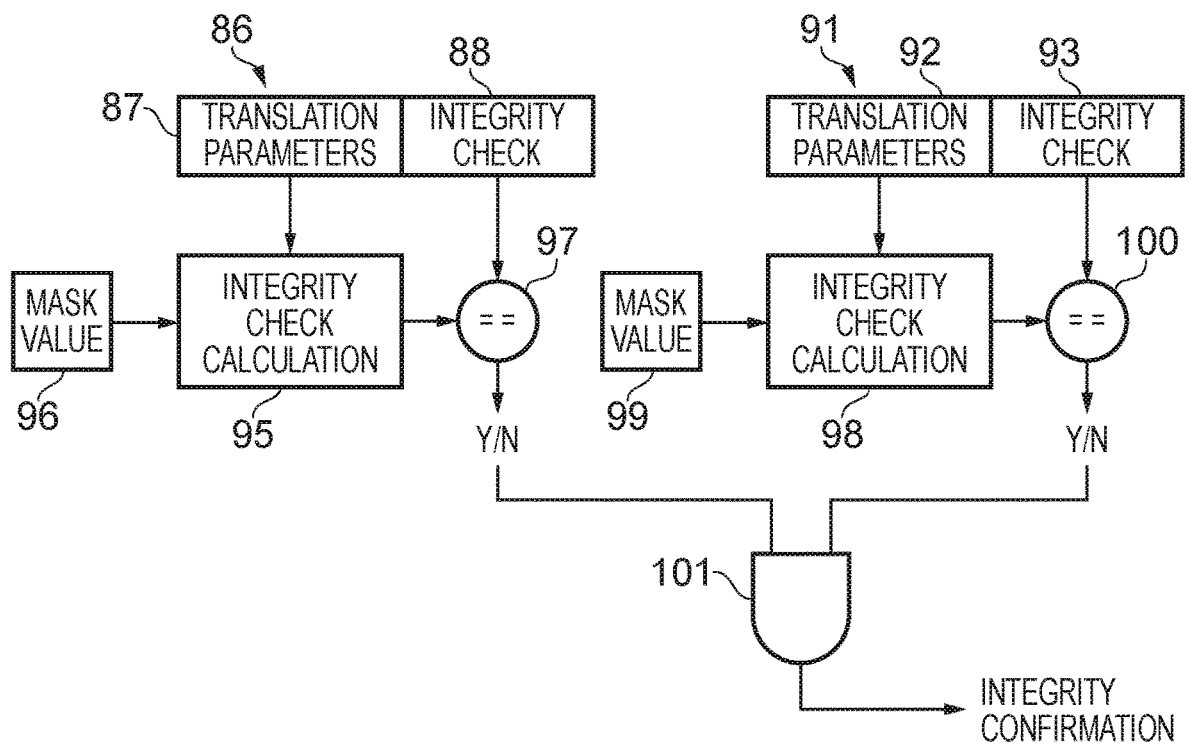

FIG. 3B schematically illustrates circuitry for performing integrity verification of entries of a multilevel page table such as that shown in FIG. 3A. Such circuitry may for example be provided as part of the integrity verification circuitry 30 in the example of FIG. 1. Accordingly from an entry 86 from a first level of the multilevel page table the translation parameters 87 are provided as an input to the integrity check calculation circuitry 95. A further input to the integrity check calculation circuitry 95 is a mask value 96 which defines what part of the translation parameters 87 should be included in the calculation. The result of the integrity check calculation is passed to the comparison circuitry 97 for comparison with the integrity check value 88 from the entry 86. Similarly from an entry 91 from a second level of the multilevel page table the translation parameters 92 are provided as an input to the integrity check calculation circuitry 98. Although integrity check calculation circuitry 98 is illustrated separately from the integrity check calculation circuitry 95, these may be provided as one and the same circuitry which performs the integrity check calculation for each level sequentially, as each level is accessed in sequence. The same applies to the comparison circuitry 97 and 100. In one example the result of the comparison 97 determines whether the calculation 98 and the comparison 100 are performed at all, in that if the comparison 97 produces a negative outcome an error is reported immediately and the page table lookup process is halted at that point. A further input to the integrity check calculation circuitry 98 is a mask value 99 which defines what part of the translation parameters 92 should be included in the calculation. This may be the same mask value as mask value 96 or may be specific to this level. The result of the integrity check calculation is passed to the comparison circuitry 100 for comparison with the integrity check value 93 from the entry 91. As in the case of FIG. 2A the integrity check calculations are authenticated with reference to a securely held private key (not explicitly shown in FIG. 3B). The confirmed integrity of both entries 86 and 91 confirms the overall integrity of the address translation being performed. In the above mentioned example where the calculation 98 and the comparison 100 are only performed at all, if the outcome of comparison 97 is positive, then a positive outcome of the comparison 100 also necessarily confirms the overall integrity. Schematically in FIG. 3B this is represented by the results of the two comparisons (97 and 100) being brought together (as schematically illustrated by the AND gate 101) to give an overall integrity confirmation.

Figure 3C:
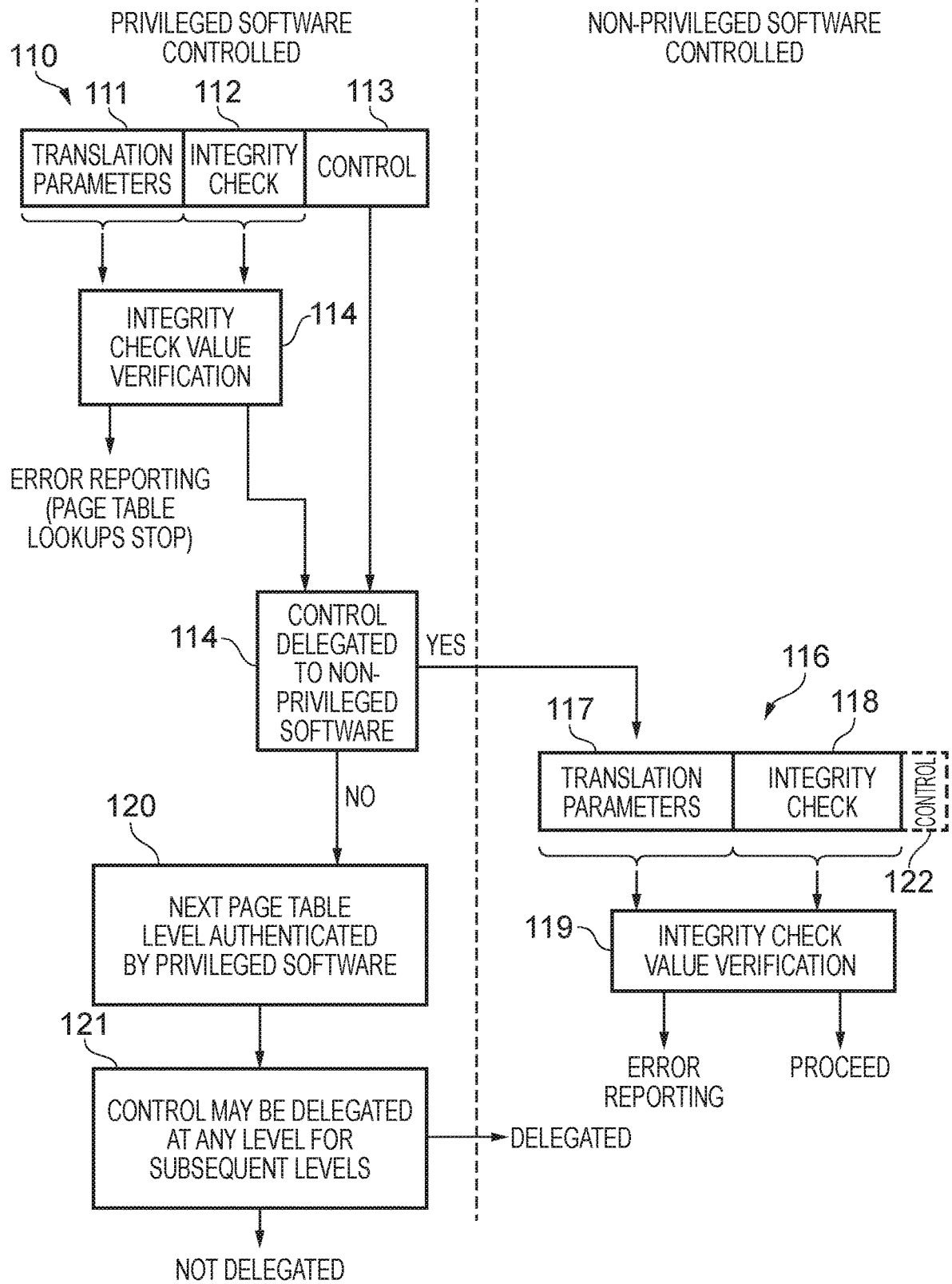

FIG. 3C schematically illustrates the use of a control bit at a higher level of a multi-level page table to delegate authentication of descriptors at subsequent levels from more privileged software to less privileged software. A descriptor 110 at a higher level of a multi-level page table (for example at the level 85 in the example of FIG. 3A) comprises translation parameters 111, an integrity check value 112, and a control bit 113. The integrity check value 112 is authenticated by a calculation 114, which is under the control of privileged software. If the integrity check value 112 is not verified, then an error is reported to the privileged software and the process stops at this point. However when the integrity check value 112 is verified, the control bit 113 then determines whether authentication of subsequent levels of the multi-level page table (e.g. level 90 in the example of FIG. 3A) is to continue to be handled by privileged software or is to be delegated to non-privileged software. Accordingly from this determination 114, when the control is delegated, a descriptor 116 at the next level is then authenticated by non-privileged software. The descriptor 116 comprises translation parameters 117 and an integrity check value 118. Under the control of the non-privileged software the integrity check value 118 is authenticated by a calculation 119. If the integrity check value 118 is not verified, then an error is reported to the non-privileged software and the process stops at this point, but otherwise it proceeds. When the determination 114 does not delegate the control, the descriptor 117 is again authenticated 120 by the privileged software. Control may be delegated 121 at any level of the multi-level page table which has at least one subsequent level. Hence, when the descriptor 117 is authenticated by the privileged software, its own control bit 122 is examined to determine whether to delegate control. Control bit 122 is not used by the non-privileged software when authenticating the descriptor 116. It will be appreciated that this mechanism for optionally delegating authentication control from more privileged software to less privileged software may therefore be implemented across any number of levels of a multi-level page table. Accordingly more privileged software can validate a larger region of the address space, while leaving smaller sub-regions (within that larger region) to be directly managed by less privileged software. The control bit set within a given validated page table entry is fed down into the further levels of the page tables, for example so that control is held by more privileged software until it is delegated, and conversely once control is delegated to less privileged software it remains delegated to the less privileged software.

Figure 4:
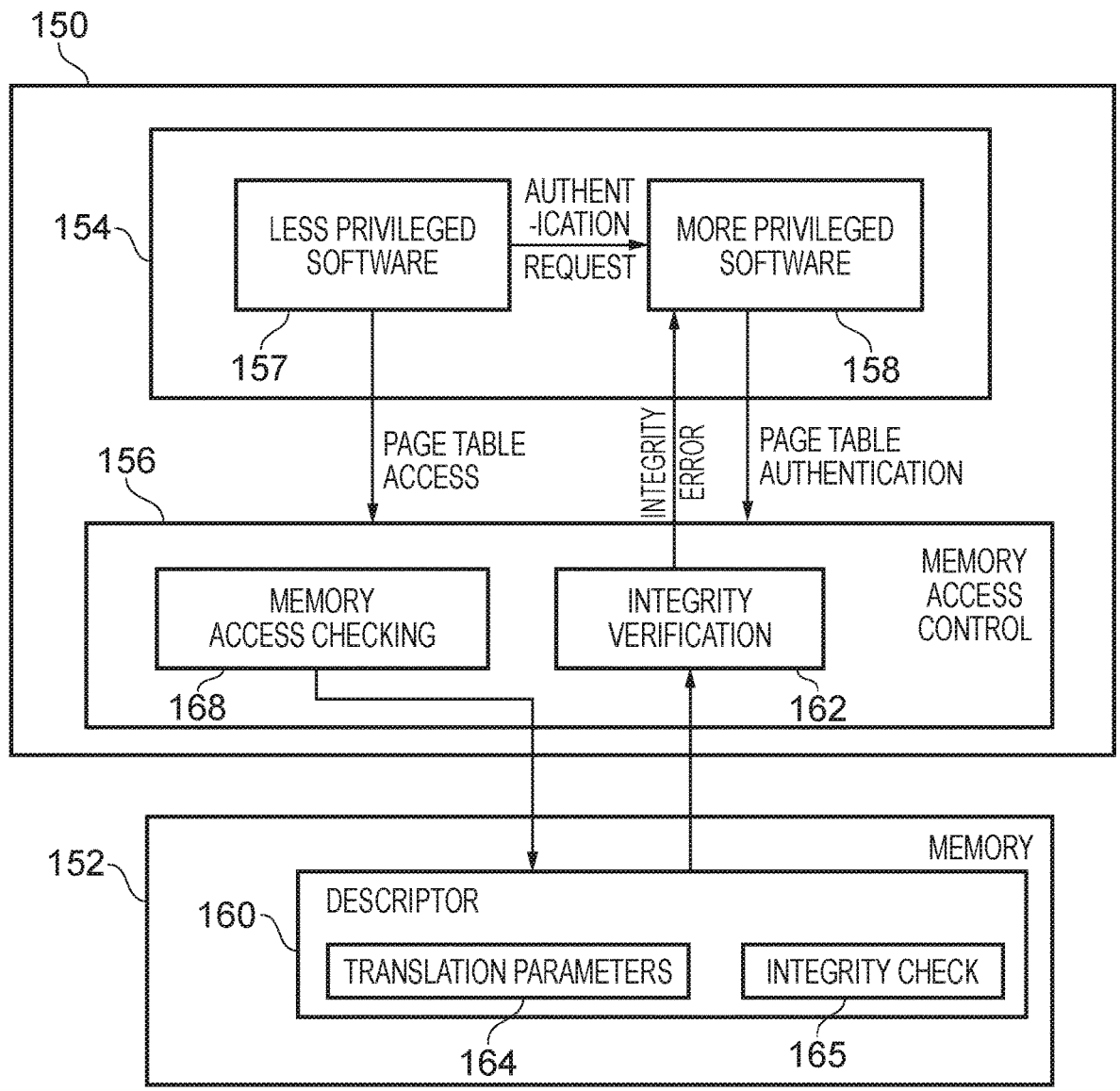

FIG. 4 schematically illustrates an example of a data processing system in which a data processor 150 accesses a memory 152. More specifically, processing circuitry 154 issues memory access requests, which are processed and checked by memory access control 156. Memory access checking circuitry 168 checks that a given memory access is in accordance with the permissions defined for the memory region to which access is sought. Those memory access requests which are permitted are allowed to proceed to the memory 152. Software executing in the processing circuitry 154 may operate at different levels of privilege, as illustrated by the less privileged software 157 and the more privileged software 158. Access to page tables in memory 152, in particular to a descriptor 160, is permitted for both the less privileged software 157 and the more privileged software 158. As described elsewhere herein, when the descriptor 160 is retrieved from memory 152, its integrity is verified by the integrity verification circuitry 162 of the memory access control circuitry 156 by performing the integrity check calculation based on the translation parameters 164 and determining if the resulting value is the same as the integrity check value 165 forming part of the descriptor 160 retrieved. In some examples, either the less privileged software 157 or the more privileged software 158 is permitted to invoke the integrity check calculation (authenticated with reference to a securely held private key), a process which includes calculating the integrity check value 165 on the basis of the translation parameters 164. However in the example shown in FIG. 4 only the more privileged software 158 is permitted to invoke the integrity check calculation (authenticated with reference to a securely held private key), a process which includes calculating the integrity check value 165 on the basis of the translation parameters 164. Either the less-privileged software 157 or the more privileged software 158 can be allowed to modify the integrity check value 165 of a descriptor 160 which is already stored in memory (and equally to modifying the translation parameters 164). Thus the memory access checking circuitry 168 can allow the less privileged software 157 to access the descriptor 160 in memory 152, and in some examples can allow the less privileged software 157 to authenticate a page table, but in the example shown in FIG. 4 only the more privileged software 158 can authenticate a page table. The less privileged software 157 can therefore handle various aspects of memory management which involve the use of the descriptor 160, but in instances where authentication of a descriptor is required, for example in a setup phase before normal use, the less privileged software 157 must send an authentication request to the more privileged software 158 to carry out such authentication. The integrity verification circuitry 162 is further arranged to report integrity errors, which in the example of FIG. 4 are sent to the more privileged software 158 (although when less privileged software 157 is permitted to authenticate a page table it can correspondingly be the recipient of integrity error reports.

Figure 5:
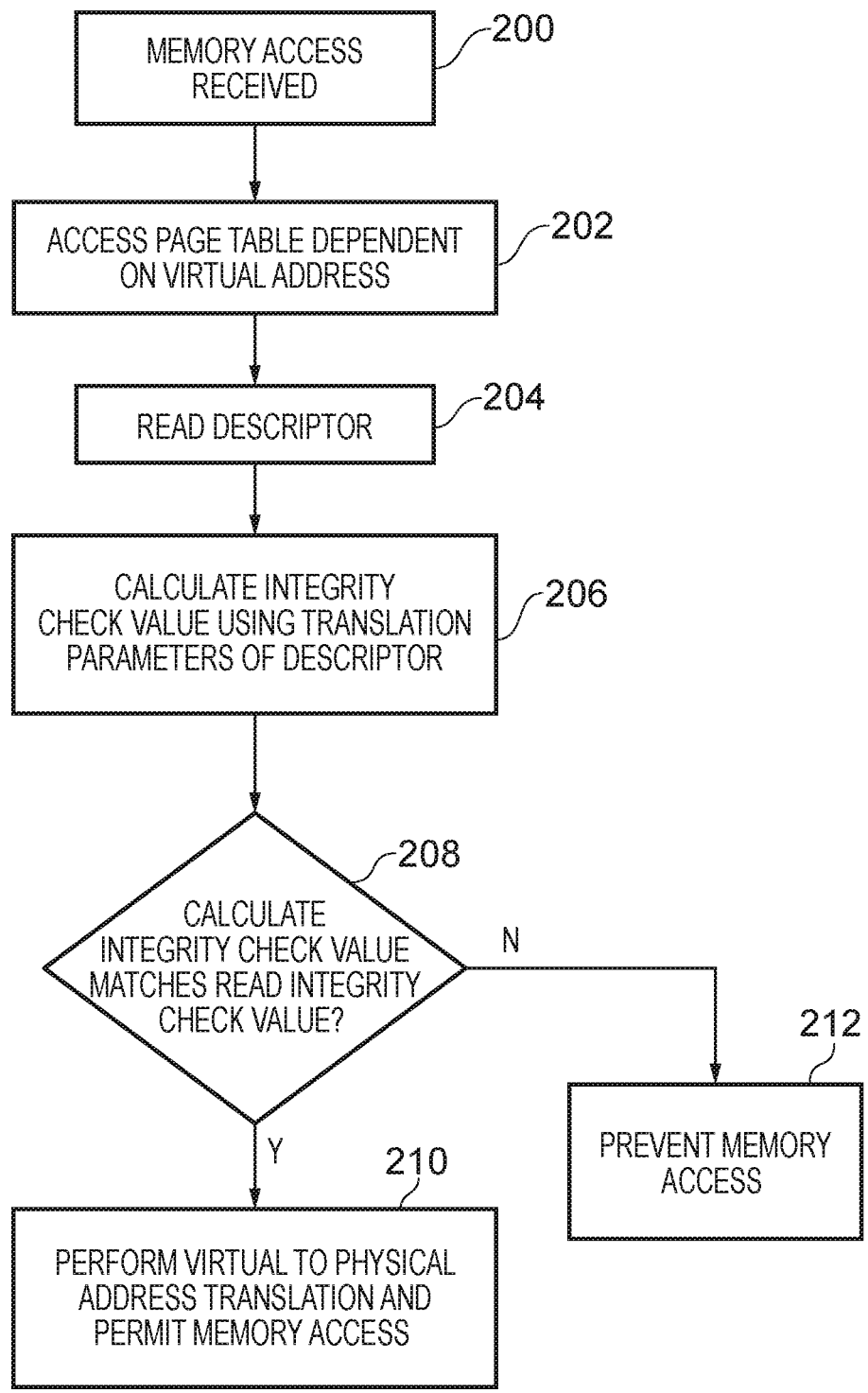
FIG. 5 is a flow diagram showing a method of carrying out page table descriptor.

FIG. 5 is a flow diagram showing a sequence of steps which are taken according to an example method. At step 200 a memory access request is received. Then at step 202 a page table is accessed dependent on the virtual address received as part of the memory access request. A descriptor in the page table is read at step 204 and at step 206 an integrity check value is calculated using translation parameters of the descriptor (and may include values from configuration registers, such as a mask value and a key). It is then determined at step 208 if calculated integrity check value matches the integrity check value read as part of the descriptor. If it does match, then the integrity of the descriptor has been verified and the flow proceeds to step 210, where the virtual to physical address translation required is performed and the memory access is permitted to proceed. Conversely, if it is determined that it does not match, then the integrity of the descriptor has been compromised and the flow proceeds to step 212, where the memory access is prevented and an error is reported.

Figure 6:
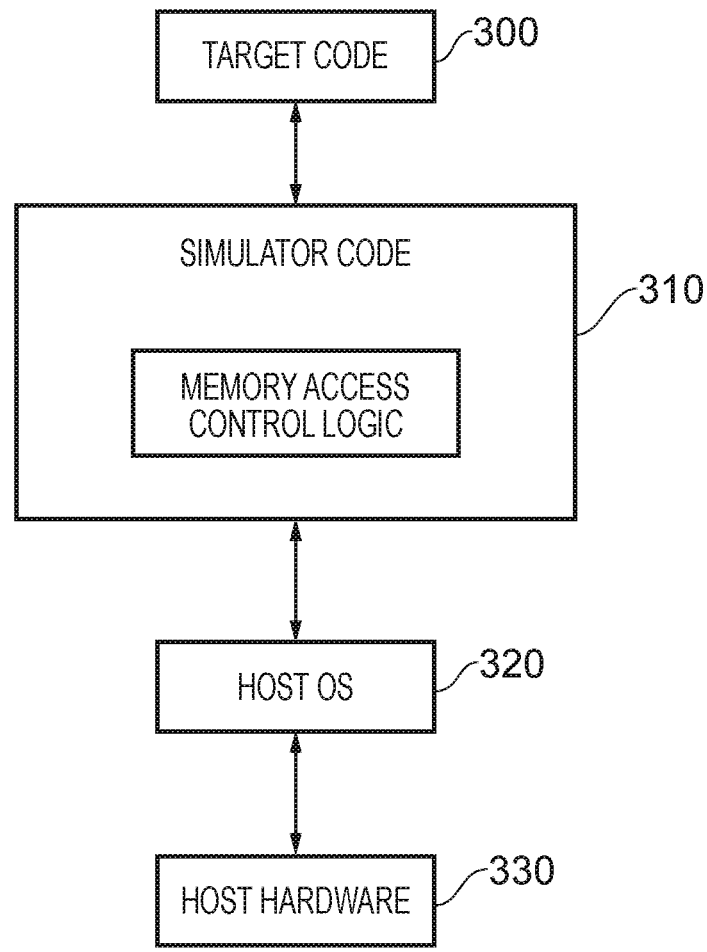
FIG. 6 shows a simulator example which may be used.

FIG. 6 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the interface of the hardware architecture being modelled by the simulator program 310. Thus, the program instructions of the target code 300, including those that result in the generation of memory access requests for which the integrity of the required translations is verified as described above, may be executed from within the instruction execution environment using the simulator program 310, so that a host computer 330 which does not actually have the hardware features of the apparatuses (e.g. the memory access control circuitry) discussed above can emulate these features.

In brief overall summary apparatuses, methods, and programs for performing a translation of a virtual address of a memory access to a physical address associated with a memory location to be accessed are disclosed. A page table descriptor is accessed when performing the translation, which comprises translation parameters for the translation. The descriptor further comprises an integrity check value, wherein the integrity check value is dependent on the translation parameters.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
   memory access control circuitry to perform a translation of a virtual address of a memory access to a physical address associated with a memory location to be accessed,
   wherein:
   the memory access control circuitry is arranged to access a page table when performing the translation;
   the page table comprises a descriptor comprising translation parameters for the translation;
   the descriptor further comprises an integrity check value, wherein the integrity check value is dependent on the translation parameters;
   the memory access circuitry comprises integrity verification value calculation circuitry to generate the integrity check value, wherein the integrity verification value calculation circuitry comprises authenticated integrity check value generation circuitry to generate the integrity check value in dependence on a private key; and
   the authenticated integrity check value generation circuitry is arranged to generate the integrity check value in response to more-privileged software and is arranged not to generate the integrity check value in response to less-privileged software.

2. The apparatus as claimed in claim 1, wherein the memory access control circuitry is responsive to the memory access to perform a descriptor integrity check comprising:
   reading the descriptor;
   calculating an integrity verification value dependent on the translation parameters of the descriptor; and
   when the integrity verification value matches the integrity check value, allowing the memory access to proceed, and
   when the integrity verification value does not match the integrity check value, blocking the memory access.

3. The apparatus as claimed in claim 2, wherein the descriptor integrity check further comprises, when the integrity verification value does not match the integrity check value, signalling an error to privileged software.

4. The apparatus as claimed in claim 1, wherein the integrity check value is dependent on all of the descriptor other than the integrity check value.

5. The apparatus as claimed in claim 1, wherein the integrity check value is dependent on less than all of the descriptor other than the integrity check value.

6. The apparatus as claimed in claim 1, wherein the memory access control circuitry is arranged to access the page table via multiple levels of a multi-level page table when performing the translation,
   and wherein more than one level of the multiple levels of the multi-level page table comprises an entry comprising a level-specific integrity check value, wherein the level-specific integrity check value is dependent on the entry.

7. The apparatus as claimed in claim 6, further comprising configuration storage holding more than one mask value, wherein for each of the more than one level of the multi-level page table a respective mask value defines which elements of the entry the level-specific integrity check value is dependent upon.

8. The apparatus as claimed in claim 1, wherein the memory access control circuitry is arranged to access the page table via multiple levels of a multi-level page table when performing the translation,
   and wherein a control descriptor of a control level of the multiple levels comprises a control bit, wherein a value of the control bit defines whether subsequent levels of the multi-level page table must be integrity authenticated by privileged software.

9. The apparatus as claimed in claim 1, further comprising configuration storage holding a mask value, wherein the mask value defines which elements of the descriptor the integrity check value is dependent upon.

10. The apparatus as claimed in claim 9, wherein the configuration storage is a configuration register.

11. A data processing method comprising:
    performing a translation of a virtual address of a memory access to a physical address associated with a memory location to be accessed,
    wherein:
    performing the translation comprises accessing a page table;
    the page table comprises a descriptor comprising translation parameters for the translation; and
    the descriptor further comprises an integrity check value, wherein the integrity check value is dependent on the translation parameters; and
    the method comprises an integrity value generation step of generating the integrity check value in dependence on a private key,
    wherein:
    the integrity value generation step comprises generating the integrity check value for storage as part of the descriptor; and
    the integrity value generation step is performed in response to more-privileged software and is not performed in response to less-privileged software.

12. The method as claimed in claim 11, further comprising performing a descriptor integrity check, wherein the descriptor integrity check comprises:
    reading the descriptor;
    calculating an integrity verification value dependent on the translation parameters of the descriptor; and
    when the integrity verification value matches the integrity check value, allowing the memory access to proceed, and
    when the integrity verification value does not match the integrity check value, blocking the memory access.

13. The method as claimed in claim 11, wherein performing the translation comprises accessing the page table via multiple levels of a multi-level page table when performing the translation,
    and wherein more than one level of the multiple levels of the multi-level page table comprises an entry comprising a level-specific integrity check value, wherein the level-specific integrity check value is dependent on the entry.

14. The method as claimed in claim 13, further comprising storing more than one mask value, wherein for each of the more than one level of the multi-level page table a respective mask value defines which elements of the entry the level-specific integrity check value is dependent upon.

15. The method as claimed in claim 11, wherein performing the translation comprises accessing the page table via multiple levels of a multi-level page table when performing the translation, and wherein a control descriptor of a control level of the multiple levels comprises a control bit, wherein a value of the control bit defines whether subsequent levels of the multi-level page table must be integrity authenticated by privileged software.

16. A non-transitory computer-readable storage medium storing a program for controlling a host data processing apparatus to provide an instruction execution environment for execution of target code, the computer program comprising:

memory access control logic to perform a translation of a virtual address of a memory access to a physical address —associated with a memory location to be accessed, wherein:

the memory access control logic is arranged to access a page table when performing the translation;

the page table comprises a descriptor comprising translation parameters for the translation;

the descriptor further comprises an integrity check value, wherein the integrity check value is dependent on the translation parameters;

the memory access control logic comprises integrity verification value calculation control logic to generate the integrity check value, wherein the integrity verification value calculation control logic comprises authenticated integrity check value generation control logic to generate the integrity check value in dependence on a private key; and the authenticated integrity check value generation control logic is arranged to generate the integrity check value in response to more-privileged software and is arranged not to generate the integrity check value in response to less-privileged software.

* * * * *